US011727422B2

(12) United States Patent
Bishnoi et al.

(10) Patent No.: US 11,727,422 B2
(45) Date of Patent: Aug. 15, 2023

(54) AUDIENCE RECOMMENDATION USING NODE SIMILARITY IN COMBINED CONTEXTUAL GRAPH EMBEDDINGS

(71) Applicant: MASTERCARD INTERNATIONAL INCORPORATED, Purchase, NY (US)

(72) Inventors: Vikas Bishnoi, Jodhpur (IN); Himanshi Charotia, New Delhi (IN); Nidhi Mulay, Indore (IN); Jessica Peretta, Purchase, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 10 days.

(21) Appl. No.: 17/164,144

(22) Filed: Feb. 1, 2021

(65) Prior Publication Data

US 2022/0245658 A1 Aug. 4, 2022

(51) Int. Cl.
*G06Q 10/00* (2023.01)
*G06Q 30/0204* (2023.01)
(Continued)

(52) U.S. Cl.
CPC ..... *G06Q 30/0204* (2013.01); *G06F 16/9024* (2019.01); *G06Q 10/0637* (2013.01); *G06Q 30/0201* (2013.01)

(58) Field of Classification Search
None
See application file for complete search history.

(56) References Cited

U.S. PATENT DOCUMENTS

| 11,068,935 B1* | 7/2021 | White ................... G06N 20/00 |
| 2012/0066065 A1* | 3/2012 | Switzer .............. G06Q 30/0255 |
| | | 705/1.1 |

(Continued)

FOREIGN PATENT DOCUMENTS

| CN | 111275459 A | 6/2020 |
| CN | 112149003 A | 12/2020 |

OTHER PUBLICATIONS

Foster, Michelle, Measuring the Audience:Why it Matters to Independent News Media and How it Can Contribute to Media Development, Oct. 2014, CIMA, https://www.cima.ned.org/wp-content/uploads/2015/02/CIMA-Audience-Measurement_updated-082416.pdf, p. 1-24. (Year: 2014).*

(Continued)

*Primary Examiner* — Joseph M Waesco
(74) *Attorney, Agent, or Firm* — Talem IP Law, LLP

(57) ABSTRACT

A method for audience recommendation using node similarity in combined contextual graph embeddings can include receiving a merchant identifier of a merchant and generating one or more merchant tags describing merchant data corresponding to the merchant. A set of audience embeddings can be generated from a set of audience auxiliary data using an audience taxonomy and a set of merchant embeddings can be generated from the merchant data relating to the merchant using the one or more merchant tags. The set of audience embeddings and the set of merchant embeddings are used to produce a heterogenous information network of combined audience data and merchant data, which is then analyzed to identify relationships between each audience and the merchant. A score for one or more audiences can be determined based on the relationships between the one or more audiences and the merchant.

18 Claims, 5 Drawing Sheets

(51) Int. Cl.
   *G06Q 10/0637*   (2023.01)
   *G06F 16/901*    (2019.01)
   *G06Q 30/0201*   (2023.01)

(56) References Cited

U.S. PATENT DOCUMENTS

| | | | |
|---|---|---|---|
| 2015/0220951 A1* | 8/2015 | Kurapati | G06Q 30/0204 |
| | | | 705/7.33 |
| 2016/0098713 A1* | 4/2016 | Fuerstenberg | G06Q 20/386 |
| | | | 705/18 |
| 2016/0180386 A1* | 6/2016 | Konig | G06Q 30/0255 |
| | | | 705/14.55 |
| 2016/0371692 A1* | 12/2016 | Clyne | G06Q 30/02 |
| 2017/0171324 A1* | 6/2017 | Yu | H04W 4/029 |
| 2017/0187722 A1* | 6/2017 | Roundtree | H04W 12/64 |
| 2021/0224862 A1* | 7/2021 | Taifi | G06V 10/764 |
| 2022/0114172 A1* | 4/2022 | Deshmukh | G06F 16/2471 |
| 2022/0138594 A1* | 5/2022 | Ackerman | G06F 21/6227 |
| | | | 706/50 |
| 2022/0230205 A1* | 7/2022 | Taifi | G06Q 30/0201 |

OTHER PUBLICATIONS

Shi, Chuan et al. "Heterogeneous Information Network Embedding for Recommendation" Nov. 29, 2017, 14 pages.
Sathish, Vishwas et al. "Graph Embedding Based Hybrid Social Recommendation System" Aug. 26, 2019, 7 pages.
Sun, Zhu et al. "Recurrent Knowledge Graph Embedding for Effective Recommendation" RecSys '18, Oct. 2-7, 2018, 9 pages, Vancouver, BC, Canada.
Dongjing Wang, et al., Music Recommendation via Heterogeneous Information Graph Embedding, 2017 International Joint Conference on Neural Networks (IJCNN), 2017, 8 Pages.
International Search Report and Written Opinion issued in International Application No. PCT/US2022/011974, dated May 17, 2022, 7 pages.
Jin-A Choi et al. "Identifying machine learning techniques for classification of target advertising" ICT Express, Jun. 2, 2020, 6 pages, vol. 6, Issue 3.

* cited by examiner

AUDIENCE RECOMMENDATION USING NODE SIMILARITY IN COMBINED CONTEXTUAL GRAPH EMBEDDINGS

BACKGROUND

Targeted advertisements have become increasingly common in the evolution of advertisement. Advertisements can be tailored to groups or even individuals in an effort to increase the success of a campaign. Targeted advertisement campaigns can be done with a variety of aims: to establish a new customer base, to reinforce an existing customer base, or to increase sales in a new area.

There has been effort to identify relevant consumers for content—whether for targeted advertisements or for serving up search results—using social graphs and other mechanisms identifying relationships between interests and people. There continues to be a challenge in determining where to target particular content.

BRIEF SUMMARY

Audience recommendation, (e.g. for a targeted advertisement campaign), can be accomplished through using node similarity in combined contextual graph embeddings. Transaction data can be leveraged and analyzed to discover relationships between two or more parties described by the data that are not superficially obvious, for example between a merchant and audiences. As an example, transaction data can be analyzed to characterize a particular merchant and reveal areas of relative strength and weakness for the merchant (compared to other merchants, between single locations of a larger chain, or even within the store such as between midscale and upscale items in the store). Similarly, potential audiences can be classified by transaction data and auxiliary data to form cohorts that are not obvious. Graphing and analyzing transaction data and auxiliary data to find node similarity in a combined contextual graph of the merchant and audience data can reveal opportunities for growth for the merchant, for example via a targeted advertisement campaign to turn one or more potential audiences into realized purchasers.

A method for audience recommendation using node similarity in combined contextual graph embeddings is provided. When providing an audience recommendation, the method can include receiving a merchant identifier of a merchant and generating one or more merchant tags describing merchant data corresponding to the merchant. The method can further include generating a set of audience embeddings from a set of audience auxiliary data relating to a set of audiences using an audience taxonomy and generating a set of merchant embeddings from the merchant data relating to the merchant using the one or more merchant tags. The audience auxiliary data includes consumer transaction data. The generating of the set of audience embeddings may occur before or after receiving the merchant identifier and, in some cases, may be asynchronously updated with new audience auxiliary data. Using the set of audience embeddings and the set of merchant embeddings, the method can continue by producing a heterogenous information network of combined audience data and merchant data. After the heterogenous information network is produced, the method further includes analyzing the heterogenous information network to identify relationships between each audience of the set of audiences and the merchant. A score for one or more audiences of the set of audiences can be determined based on the relationships between the one or more audiences and the merchant. The one or more audiences of the set of audiences and a corresponding score can then be provided as part of the audience recommendation. In some cases, content can then be directed to consumers associated with at least one of the one or more audiences based on the corresponding score.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Audience recommendation, (e.g. for a targeted advertisement campaign), can be accomplished through using node similarity in combined contextual graph embeddings.

An audience refers to a group of consumers having a set of common characteristics, which may be selected from demographics, behaviors, and interests. Demographics refer to information such as age, gender, location, education, income, and employment. Behaviors refer to actions (and interactions) with respect to, for example, a particular product or type of product, travel, and habits. Interests refer to topics, entities, and activities that a person gives or desires to give attention to.

For targeted advertisement campaigns, media platforms may have a set of available target audiences that they have assigned people to based on a variety of factors. Some may be solely identified by demographics while others utilize or leverage relationships determined from a variety of algorithms and market data.

As targeted advertisement increases, it can become increasingly difficult to effectively perform audience selection manually, particularly as the scale increases. A data-driven approach can yield effective results, but such an approach cannot often be supported solely on market research.

As presented herein, transaction data can be leveraged and analyzed to discover relationships that are not superficially obvious. For example, transaction data can be analyzed to characterize a particular merchant and reveal areas of relative strength and weakness for the merchant. Similarly, potential audiences can be classified by transaction and auxiliary data to form cohorts that are not obvious. Graphing and analyzing transaction data and auxiliary data to find node similarity can reveal opportunities for growth for the merchant, for example via a targeted advertisement campaign to turn one or more potential audiences into realized purchasers.

Figure 1:
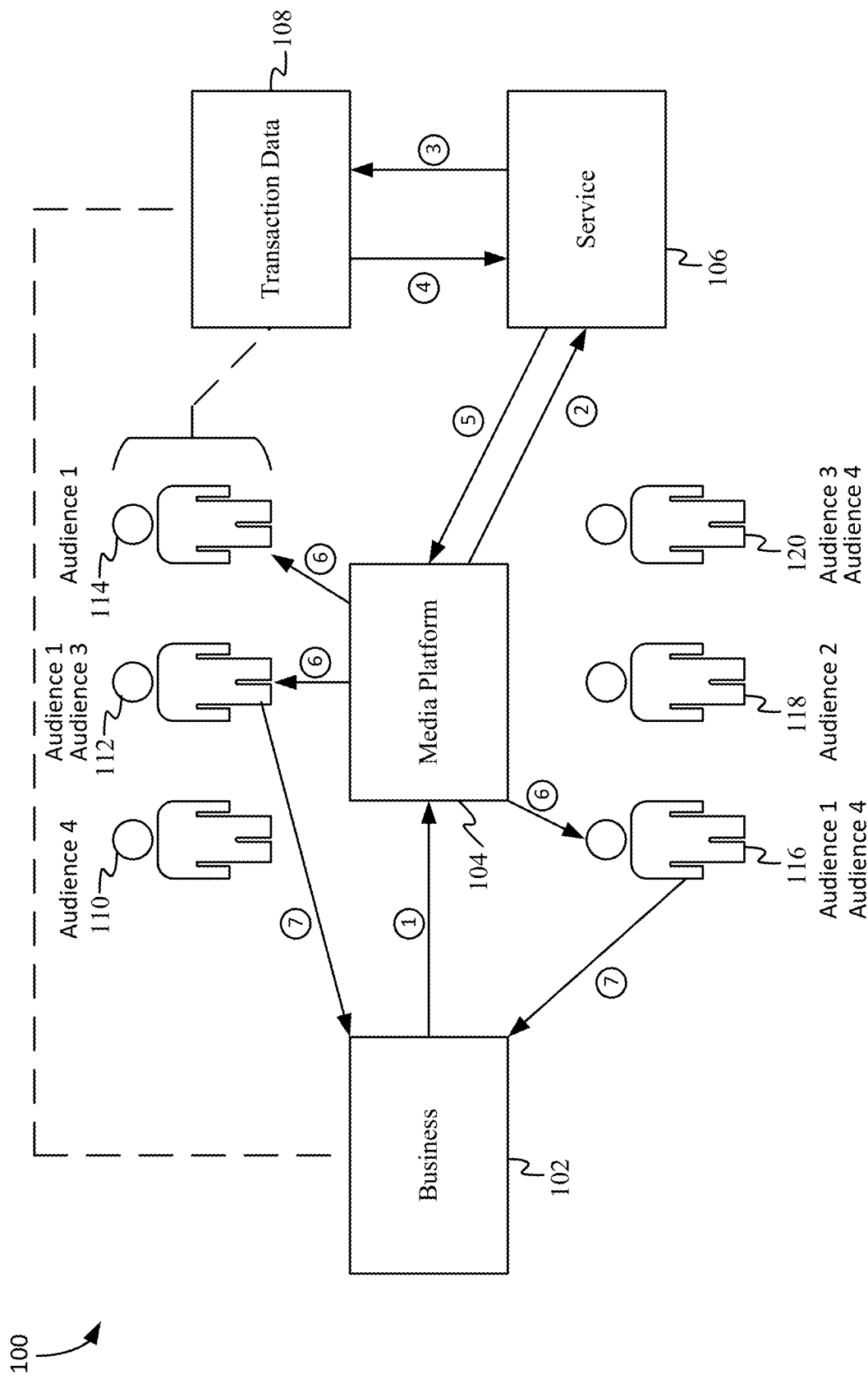
FIG. 1 shows an operating environment illustrating a scenario for audience recommendation using node similarity in combined contextual graph embeddings.

FIG. 1 shows an operating environment illustrating a scenario for audience recommendation using node similarity in combined contextual graph embeddings. The operating environment 100 reflects a scenario involving a merchant "business" 102, a media platform 104, a recommender service 106 (which may be hosted by a recommender system), and a data resource 108 that can store or make available transaction data. The operating environment can also include a plurality of consumers (e.g., including first consumer 110, second consumer 112, third consumer 114, fourth consumer 116, fifth consumer 118, and sixth consumer 120) that each may be characterized as being assigned to one or more particular audiences of a set of audiences. For example, given a scenario where the set of audiences contains four audience characterizations, the first consumer 110 is classified as a fourth audience type, the second consumer 112 is classified as a first audience type and a third audience type, the third consumer 114 is classified as the first audience type, the fourth consumer 116 is classified as the first audience type and the fourth audience type, the fifth consumer 118 is classified as a second audience type, and the sixth consumer 120 is classified as a third audience type and the fourth audience type. These classifications, when used by the media platform 104 would result in content being delivered to that consumer's social media feed, browser ad space, or other media channel managed by the media platform.

In the illustrated scenario, the business 102 is preparing an ad campaign. The business 102 may be a large chain seeking a national ad strategy or may be a local business looking for regional advertising. The media platform 104 can be used to determine and/or implement an ad strategy (with respect to audiences) for the business 102. When used to determine the ad strategy, the media platform 104 may utilize recommender service 106 to identify and recommend one or more audiences for the targeted advertisements. Recommender service 106 uses transaction data from data resource 108 to perform audience recommendation using node similarity in combined contextual graph embeddings as described herein. Data resource 108 can also store auxiliary data that is used along with the transaction data to provide the audience recommendations.

As used herein, auxiliary data refers to information that may not be part of the transaction data itself, but which may be used to identify an audience. Examples of auxiliary data include, but are not limited to, demographic information of age, gender, income, and marital status.

Transaction data, such as stored in data resource 108, includes, at a minimum, at least two transaction attributes. Transaction attributes of the transaction data can include, but are not limited to, a merchant identifier (e.g., a merchant's name or other identifying information), a masked user identifier (e.g., a masked card number or other value or string used to distinguish between users but not reveal actual user information), a value (e.g., an amount of money), currency, a payment method (e.g., particular card product such as Mastercard, Visa, American Express, payment type such as credit, debit, pre-paid), a time and date, and the goods and/or services being sold in exchange for the value, as well as other information. In some cases, the transaction attributes are any transaction attributes available according to one or more standards (e.g., ISO). It should be understood that any transaction data stored or accessed by the recommender service 106 is maintained according to appropriate privacy policies and laws, and would not include personal or financial information of customers except that which is permitted (for example by opt-in processes). The transaction data can be obtained from systems that process payment transactions, including single message systems, dual message systems, and electronic payment wallet application systems. Some transaction data such as the goods and/or services being sold, can be obtained from an acquirer or issuer when not directly available from the fields in a transaction data message.

One or more of the business 102, media platform 104, recommender service 106, and data resource 108 can be managed as part of a single larger entity. For example, the business 102 and media platform 104 may be part of a first larger entity (e.g. the media platform 104 is an advertising group within the business 102). Alternatively, the media platform 104 and the recommender service 106 can be part of a second larger entity (e.g. the recommender service 106 is owned, operated, and hosted by the media platform 104). The recommender service 106 and data resource 108 can be part of a third larger entity (e.g. the service is offered by a card network which leverages in-house transaction or auxiliary data).

A sequence flow is illustrated for the example scenario. Prior to action by the business 102, transaction data can be collected from consumers and stored in the data resource 108 as described above. In addition, transaction data may continue to be collected asynchronous to any use of the data resource 108. Turning to flow (1), the business 102 can send a request to the media platform 104 to initiate an ad campaign. In flow (2), the media platform 104 can use the recommender service 106 to curate a list of one or more audiences to target. In flows (3) and (4), the recommender service 106 can request and obtain transaction data from transaction resource 108 to perform the processes for generating an audience recommendation. In some cases, the recommender service 106 performs method 300 as described with respect to FIG. 3. A particular implementation of audience recommendation using node similarity in combined contextual graph embeddings can be seen in FIG. 4.

In flow (5), the results of the analysis from the recommender service 106 are provided to the media platform 104. In flows (6), based on the identified target(s) resulting from the information provided by the recommender service 106, a targeted ad campaign can be implemented. That is, content can be directed to consumers associated with at least one of the one or more audiences based on the corresponding score. In the illustrated scenario, the targeted ad campaign is directed to the first audience of the set of audiences. As illustrated in flow (7), as a result of the campaign, one or more of the consumers classified as the targeted audience may visit the business 102 and engage in a transaction. This information may be fed back to provide additional transaction data.

Figure 2B:
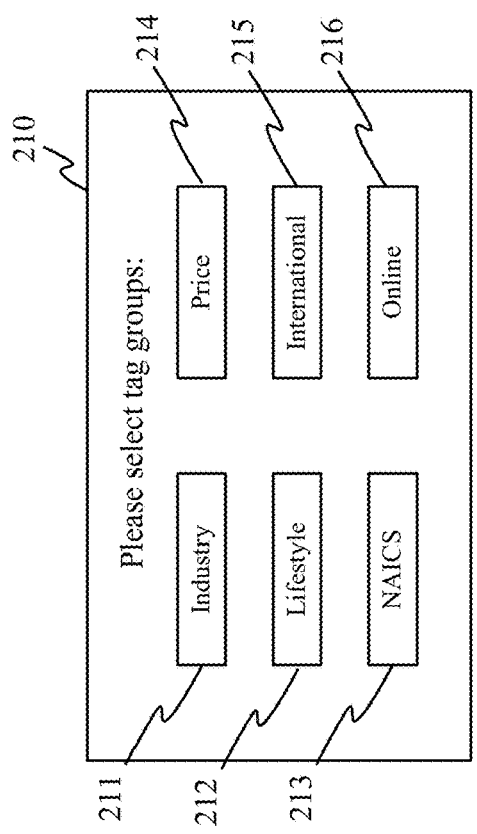
FIGS. 2A-2D illustrate a representative user experience accessing a service providing audience recommendation using node similarity in combined contextual graph embeddings.
Figure 2D:
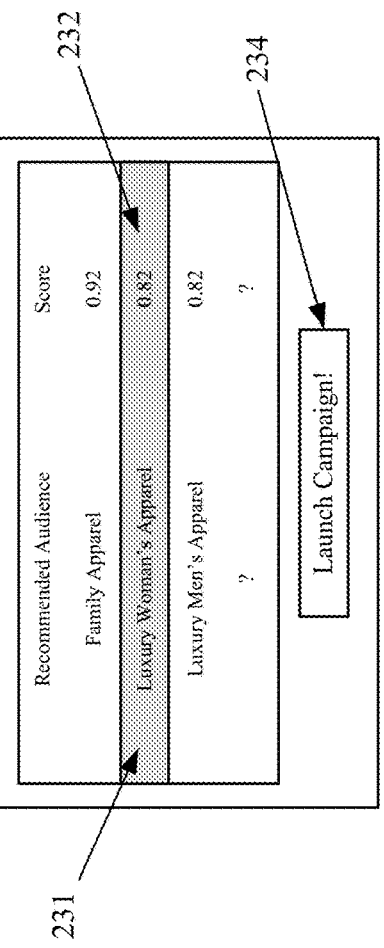
Figure 2A:
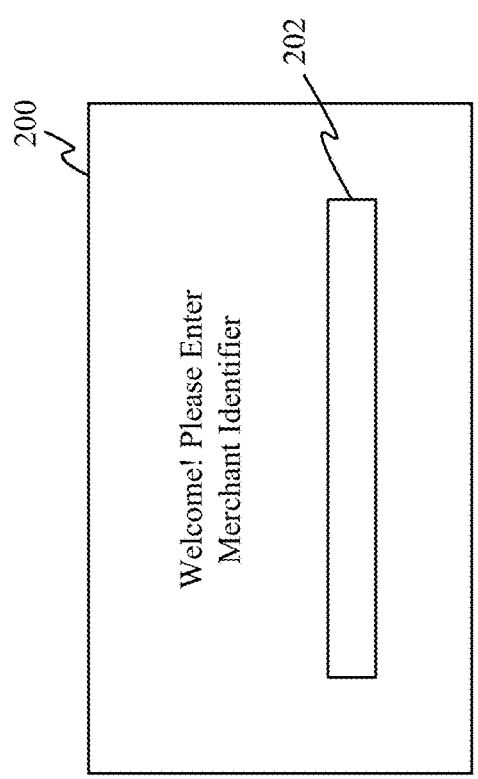

FIGS. 2A-2D illustrate a representative user experience accessing a service providing audience recommendation using node similarity in combined contextual graph embeddings. Turning to FIG. 2A, an application or webpage can have an input screen for the service to receive a merchant identifier of a merchant. In the simplified graphical user interface, a first screen 200 is provided with an input field 202 for a user to enter the merchant identifier. The merchant identifier can, for example, be a name, numeric identifier, or address associated with a business. Any suitable input field may be used, including but not limited to a natural language input and a drop down menu. Additional information may be requested via the first screen 200. For example, if the user enters the name of a large chain, the interface may request clarification if the analysis should consider all locations or one or more locations in particular. In some cases, verification may be required to proceed. For example, if a large chain is submitted, the system may require that the user verify that they are part of the chain and are authorized to make the request. The system can also request consent to analyze transaction or auxiliary data associated with the business.

Turning to FIG. 2B, the application or webpage can inform the user of the particular tags that the system has assigned to the merchant and, in the illustrated scenario with screen 210, enable the user to adjust which types of tags (the "tag group") that the system uses in the analysis. The tag groups can include, for instance, industry descriptions 211, lifestyle categories 212, NAICS industry code 213, price range 214, international sales 215, and online sales 216. Industry description can be a short summary of one or more fields in which the merchant operates. Lifestyle categories can be a description of perceived quality—example labels include luxury, upscale, midscale, budget. NAICS (North American Industry Classification System) is a standard used by Federal statistical agencies in classifying business establishments. Price range can be a numerical range of items that are sold above a certain frequency threshold. International sales and online sales can be representations of whether or not the merchant performs sales in those ways. International sales and online sales can be represented, for example, by a binary flag. The tags for each tag group can be determined by the recommender system using, for example, transaction data associated with the merchant identifier as stored in a data resource such as data resource 108 described with respect to FIG. 1.

Here, the user can select one or more tag groups to be included in the analysis, and submit the tag groups to be included in the analysis. In some cases, in addition to selecting the tag groups, the system allows for the tags associated with each tag group to be adjusted by the user. For example, the graphical user interface can supply the list of tags associated with each tag group that were determined by the system for the user to select. It should be understood that in various scenarios, the user cannot change the tags as at least some of the tags would be fixed for a merchant. Therefore, a screen 210 may not be available as part of the application or webpage. In some of such cases, tags such as international and online can be turned on and off and used for filtering the audience while giving recommendation. A screen may be provided for enabling this function and/or a command/interface provided as part of a screen such as shown in FIG. 2D.

Figure 2C:
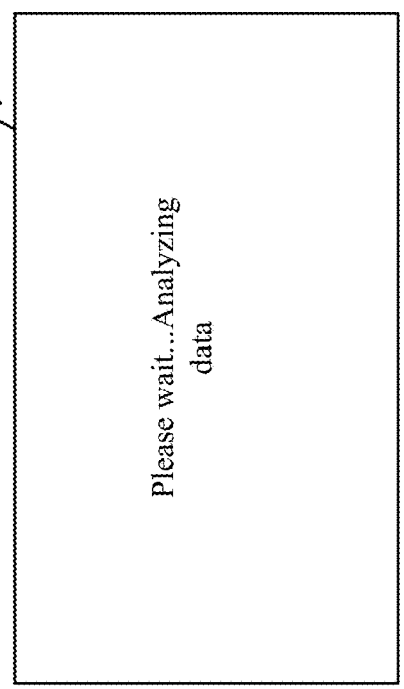

Turning to FIG. 2C, the system can proceed with analyzing transaction or auxiliary data of the business based on the tags and the graphical user interface may reflect that action is being taken on behalf of the user, such as illustrated in screen 220. Here, the information received via the graphical user interface screen 200 (and optionally screen 210) can be used by recommender system to carry out processes 300 and 400 such as described with respect to FIG. 3 and FIG. 4.

Turning to FIG. 2D, the computing device on which the representative graphical user interfaces are rendered can receive a list of audiences and scores associated with each audience from the recommender system. Some or all of the results can be displayed, such as shown in screen 230. The list can be curated and only include audiences above a particular score, or the list can include all possible audiences. The list can be sorted by descending score. The list can also be sorted by various filters and grouping audiences, for example based on characteristics of the audience (e.g. all audiences of women can be sorted together separately from all audiences of men). In some cases, one or more audiences can be selected via screen 230 and that information used directly or communicated with a media platform (or with another entity) for use in targeted advertising or other purposes. Here, the user selected an audience 231 of "Luxury Woman's Apparel," which has a score 232 of 0.82 (where scale is between 0 and 1.00). In the illustrated example, a button command 234 is included to apply the selected one or more audiences for distribution of targeted content.

Figure 3:
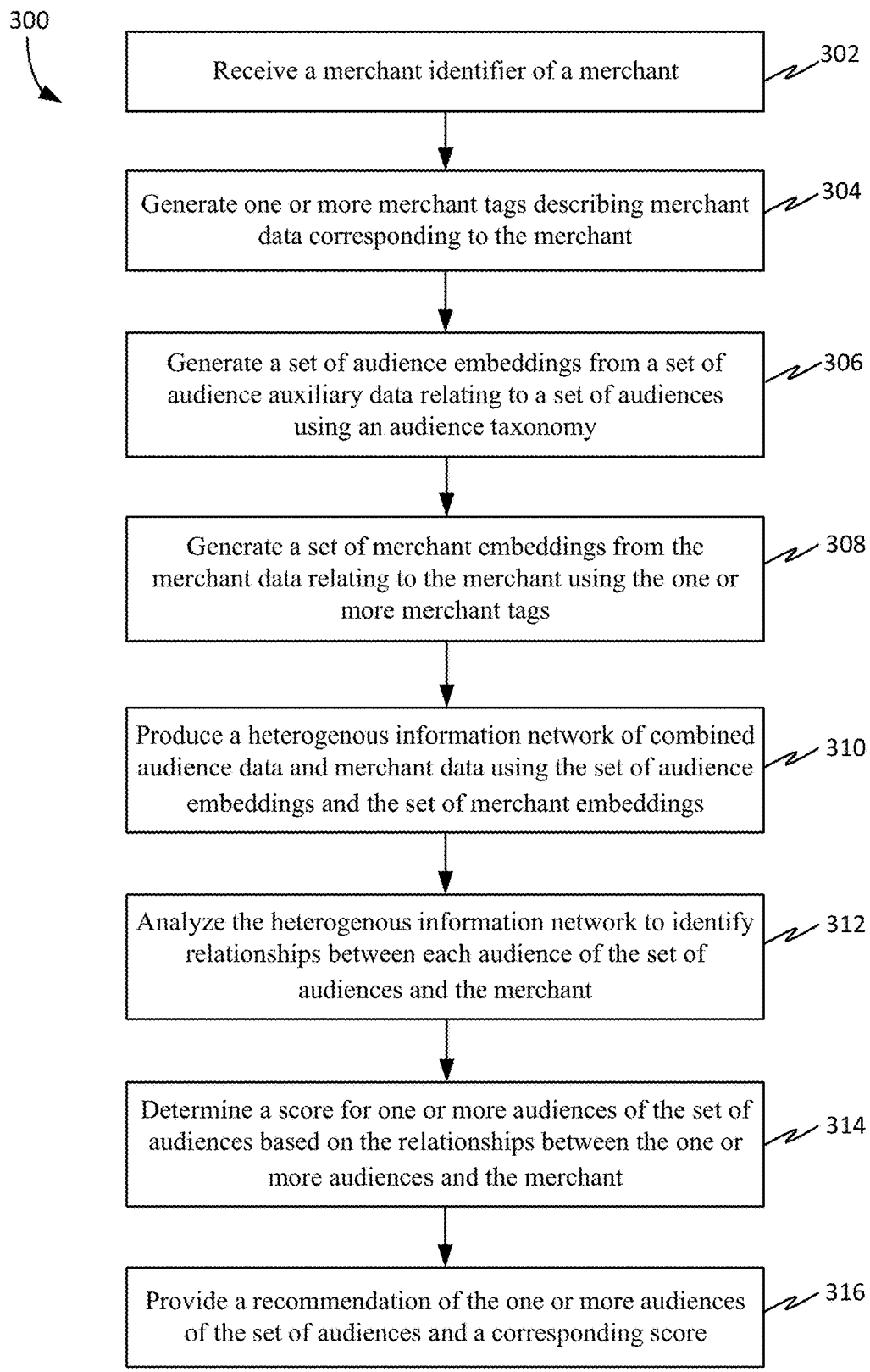
FIG. 3 illustrates a method of audience recommendation using node similarity in combined contextual graph embeddings.

FIG. 3 illustrates a method of audience recommendation using node similarity in combined contextual graph embeddings. The method 300 can provide an audience recommendation for a particular merchant. Referring to FIG. 3, method 300 can begin with receiving (302) a merchant identifier of a merchant. The merchant identifier can be, for example, a name, number, or address associated with the business. In some cases, the merchant identifier can specify a particular business, for example, one store of a large franchise. The system (which may be embodied as system 500 of FIG. 5) performing the method 300 can then generate (304) one or more merchant tags describing merchant data corresponding to the merchant. The system can determine tags based on transaction and auxiliary data of the merchant's business. The tags can include one or more of industry (with label), lifestyle (with label related to category of quality such as luxury, upscale, midscale, and budget), NAICS industry code, price range, international sales availability (binary option), and online sales availability (binary option).

The system can also provide a list of possible tags and receive input from the business indicating which tags should be used. The list of possible tags can be a list of all possible tags, or the list may be curated based on transaction or auxiliary data. For example, a merchant may be seeking to expand the merchant's business, and transaction data may indicate that the business sales are best in the luxury category, but the merchant may be seeking to grow sales in the midscale category.

In some cases, certain tags can be submitted instead of or in addition to the merchant identifier, for example for cases where there is no established business yet or it is desired to identify audiences for particular tags.

The method 300 can include generating (306) a set of audience embeddings from a set of audience auxiliary data relating to a set of audiences using an audience taxonomy by performing one or more analyses on the set of audience auxiliary data relating to the set of audiences using the audience taxonomy. Here, the audience auxiliary data includes transaction data and, optionally, auxiliary data such as certain demographic data. The audience embeddings may be generated using pre-trained GloVe embeddings.

Similarly, a set of merchant embeddings can be generated (308) from the merchant data relating to the merchant using the one or more merchant tags by performing one or more analyses on the merchant data relating to the merchant using the one or more merchant tags. The merchant embeddings may be generated using pre-trained GloVe embeddings.

An embedding refers to a vector representation of a variable (e.g., categorical variables such as available in the merchant and audience data). In particular, an embedding is a relatively low-dimensional, learned continuous vector representation, or space, into which high-dimensional vectors can be translated. Embeddings can encode relationships (e.g., similarity) between categorical variables.

The system can then produce (310) a heterogenous information network of combined audience data and merchant data using the set of audience embeddings and the set of merchant embeddings. The heterogenous information network can be in the form of star graphs (and may include bistar graphs). The heterogenous information network can be produced by mapping the audience embeddings and merchant embeddings as nodes and finding connections between nodes.

After the heterogenous information network is produced, the system can analyze (312) the heterogenous information network to identify relationships between each audience of the set of audiences and the merchant. The analysis can include various graph traversal and search algorithms, including least cost/minimum cost path and node similarity algorithms. For example, a distance between the merchant and one audience can be found by tracing a path between the merchant and the one audience and characterizing the relationship based on the shortest distance between the merchant and one audience. The system can then determine (314) a score for one or more audiences of the set of audiences based on the relationships between the one or more audiences and the merchant. The score can be, for example, based on the distance between the merchant and one set of audience. The system can then provide (316) a recommendation of the one or more audiences of the set of audiences and a corresponding score. The recommendation may be displayed. In some cases, the recommendation triggers the directing of content to consumers associated with at least one of the one or more audiences based on the corresponding score, for example, via a social media platform.

Figure 4:
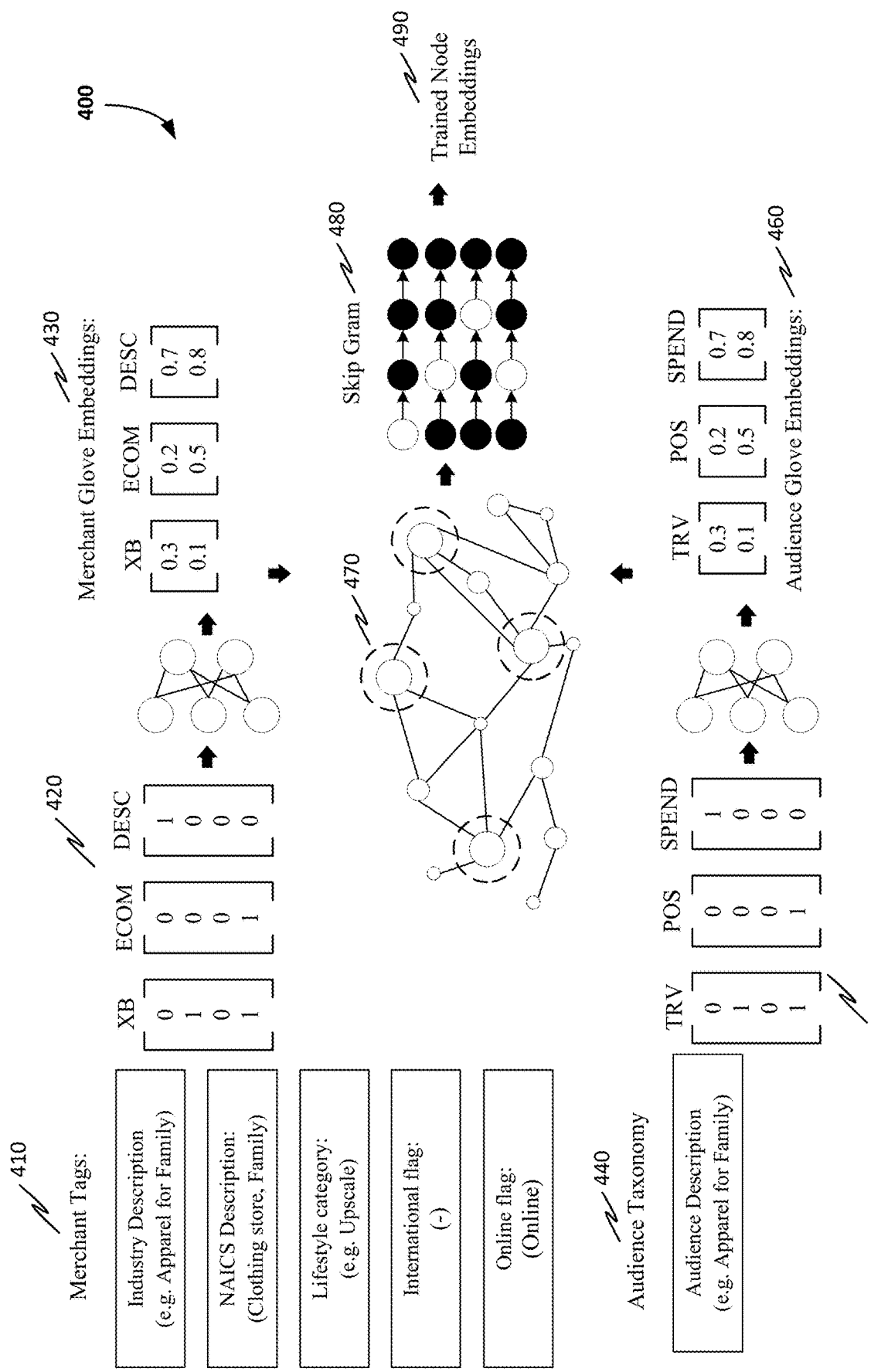
FIG. 4 is a representational diagram of a specific implementation of a method of audience recommendation using node similarity in combined contextual graph embeddings.

FIG. 4 is a representational diagram of a specific implementation of a method of audience recommendation using node similarity in combined contextual graph embeddings. Referring to FIG. 4, a method 400 of audience recommendation can be based on merchant tags 410, which may be generated using customer transaction data which act as merchant descriptors. Here, the merchant tags 410 include industry description (e.g., apparel for family), NAICS description (e.g., clothing store, family), lifestyle category (e.g., upscale), International flag (e.g., not set), Online flag (e.g., online). Merchant embeddings can be generated by performing matrix factorization 420 and generating merchant glove embeddings 430.

An audience taxonomy 440, with predefined audience descriptors (e.g., apparel for family) can be used to group consumers using transaction data and optionally auxiliary data (e.g., age). The consumers can be assigned to a particular audience and the audience defined by performing matrix factorization 450 and generating audience glove embeddings 460.

Matrix factorization is an embedding model that given the feedback matrix $A \in \mathbb{R}^{m \times n}$ where m is the number of users (e.g., consumers forming an audience) and n is the number of items (e.g., purchases), the model learns a user embedding matrix $U \in \mathbb{R}^{m \times d}$, where row i is the embedding for user i; and an item embedding matrix $V \in \mathbb{R}^{n \times d}$, where row j is the embedding for item j.

The particular matrix factorization algorithm (e.g., objective function) can be any suitable matrix factorization algorithm used in recommender systems, including, but not limited to, Funk MF, SVD++, Asymmetric SVD, Hybrid MF, and Deep-Learning MF.

Global vector (also known as GloVe or glove) is a technique for analyzing and grouping words based on semantic meaning, allowing text to be turned into word embeddings and thus understood by machines. Unlike other methods that rely on word vectors, glove techniques allow for global statistics rather than just local statistics (relying on immediate context to classify words). Word embeddings, or a learned representation of text wherein words with similar meanings can be represented similarly, often numerically as vectors, can be produced by this method to process text for semantic meaning in a way that can be understood by a computer.

The merchant glove embeddings 430 and audience glove embeddings 460 can be combined into a contextual graph 470, for example in the form of star graphs or a heterogenous information network. The merchant glove embeddings 430 and audience glove embeddings 460 can be used as nodes and connected with edges based on similarity.

After generating the contextual graph 470, the contextual graph 470 can be further analyzed by a skip gram 480 to refine the contextual graph 470. That is, a skip gram model can be trained over glove embeddings and not on one hot encodings to learn merchant-audience specific interactions. Merchant and audience nodes can be initialized as zero vectors of same dimensions as glove output embeddings. A dedicated neural network can be used to perform the skip gram 480. A set of trained node embeddings 490 can also be generated and saved to train and refine the neural network that performs the skip gram 480. The resulting refined graph 470 can be used to determine scores for recommended audiences.

Figure 5:
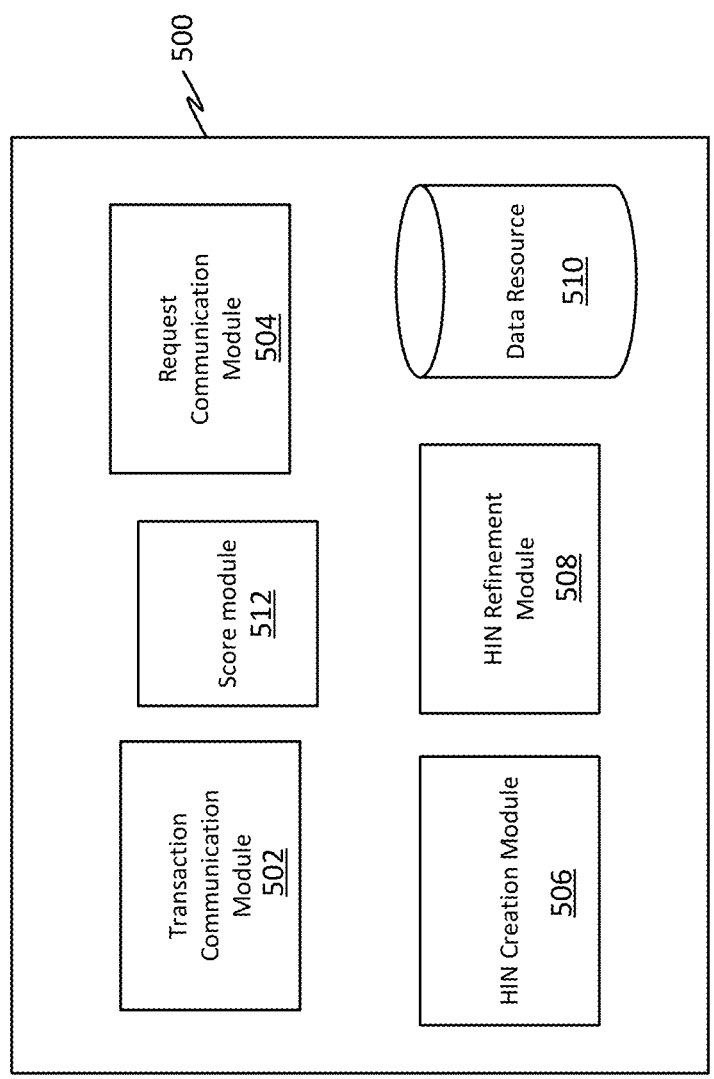
FIG. 5 illustrates a system for performing audience recommendation using node similarity in combined contextual graph embeddings.

FIG. 5 illustrates a system for performing audience recommendation using node similarity in combined contextual graph embeddings. The system 500 can include several modules, including a transaction communication module 502, a request communication module 504, a heterogenous information network creation module 506, a heterogenous information network refinement module 508, and a score module 510. The system 500 can also include one or more data resources 512 to store relevant information. In some implementations, the modules include a computer readable storage medium having instructions stored thereon that direct a processing system (e.g., a hardware processor) to perform the functions associated with that module. In some cases, a module may have designated hardware. In some cases, a module may be executed on a virtual machine running on a host device supporting more than one module. In some cases, a module can be implemented entirely in hardware.

The transaction communication module 502 can include or utilize a network interface of the system 500 that enables the system 500 to communicate over a network. The transaction communication module 502 can allow for communication outside of the system 500, for example, with a card network or other repository of transaction or auxiliary data. The transaction communication module 502 can include physical circuitry to protect against an attack and can also include software to protect against an attack due to the potentially sensitive information received. The transaction communication module 502 can communicate with the payment card network over established payment card network rails (including established application programming interfaces).

The request communication module 504 can include or utilize a network interface of the system 500 (and in some cases may use the same network interface as the transaction communication module 502). The request communication module 504 can allow for communication outside of the system 500, for example with an individual, business, or media platform looking to use a service provided by the system 500. The request communication module 504 can include on or more application programming interfaces to support communication and access to functionality by requesting parties (e.g., the computing systems running recommender or advertising applications). In some instances, the transaction communication module 502 and the request communication module 504 can be combined into a generalized communication module. As mentioned above, the transaction communication module 502 and the request communication module 504 can, in some cases, use the same physical communication circuitry.

The heterogenous information network creation module 506 can perform operations 308, 310, and 312 of FIG. 3. In a specific implementation the heterogenous information network creation module 506 can produce a combined graph of merchant glove embeddings and audience glove embeddings based on transaction and auxiliary data, as described with respect to FIG. 4.

The heterogenous information network refinement module 508 can refine the heterogenous information network and interpret the heterogenous information network to transform the heterogenous information network into a more easily digestible format, such as a list. The heterogenous information network refinement module 508 can include one or more sub modules to perform the analysis, such as a skip gram analysis, on the heterogenous information network. The heterogenous information network refinement module 508 can also communicate with or include machine learning. If machine learning is used, heterogenous information network refinement module 508 can also save results in the one or more data resources 512 to provide data to be analyzed and used in training. The heterogenous information network refinement module 508 can also update the model used in the machine learning process, such as described with respect to FIG. 4.

The score module 510 can determine a score for one or more audiences based on the graph created by the heterogenous information network creation module 506 (and which is refined by the heterogenous information network refinement module 508).

The one or more data resources 512 can be used to save or store any data that is to remain in the system for an extended period of time. For example, transaction or auxiliary data may be saved locally instead of constantly streamed. Results from analyses can also be saved for use in training. The system 500 can also offer profiles for users, rather than receiving requests in an ad-hoc fashion, and the profiles can be stored in the one or more data resources 512. If sensitive data is stored in the one or more data resources 512, a subset of the one or more data resources 512 can include physical or digital security countermeasures to prevent exposure of data.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for audience recommendation using node similarity in combined contextual graph embeddings, the method comprising:
   receiving, by an audience recommender system, a merchant identifier of a merchant entered via a graphical user interface at a computing device accessing a recommender service of the audience recommender system;
   generating, by the audience recommender system, one or more merchant tags describing merchant data corresponding to the merchant identified by the merchant identifier;
   generating, by the audience recommender system, a set of audience embeddings from a set of audience data relating to a set of audiences using an audience taxonomy;
   generating, by the audience recommender system, a set of merchant embeddings from the merchant data relating to the merchant using the one or more merchant tags;
   producing, by the audience recommender system, a heterogenous information network of combined audience data and merchant data using the set of audience embeddings and the set of merchant embeddings;
   training, by the audience recommender system, a neural network for performing a skip gram using a set of trained node embeddings,
   analyzing, by the audience recommender system, the heterogenous information network to identify relationships between each audience of the set of audiences and the merchant, wherein the analyzing the heterogenous information network comprises applying, using the neural network, a skip gram model trained over glove embeddings of the merchant embeddings and the audience embeddings to produce a refined heterogeneous information network and an updated set of trained node embeddings;
   refining, by the audience recommender system, the neural network for performing the skip gram using the updated set of trained node embeddings,
   determining, by the audience recommender system, a score for one or more audiences of the set of audiences based on the relationships between the one or more audiences and the merchant as indicated in the refined heterogenous information network; and
   providing, from the audience recommender system to the computing device accessing the recommender service of the audience recommender system, a recommendation of the one or more audiences of the set of audiences and a corresponding score for each audience.

2. The method of claim 1, further comprising:
   displaying the recommendation.

3. The method of claim 1, further comprising:
   directing content to consumers associated with at least one of the one or more audiences based on the corresponding score.

4. The method of claim 3, further comprising:
   providing the one or more merchant tags; and
   receiving input indicating which tags to use to generate the set of merchant embeddings.

5. The method of claim 1, wherein generating the one or more merchant tags for the merchant comprises using transaction data of the merchant.

6. The method of claim 1, wherein generating the one or more merchant tags for the merchant comprises receiving the one or more merchant tags via an interface.

7. The method of claim 1, wherein generating the set of merchant embeddings from the merchant data relating to the merchant using the one or more merchant tags comprises using glove embeddings.

8. The method of claim 1, wherein generating the set of audience embeddings from the set of audience data relating to the set of audiences using the audience taxonomy comprises using glove embeddings.

9. The method of claim 1, wherein the one or more merchant tags include lifestyle categories.

10. The method of claim 1, wherein the one or more merchant tags include industry descriptions.

11. The method of claim 1, wherein the heterogenous information network comprises star graphs.

12. A recommender system comprising:
a processing system; and
storage media having instructions stored thereon that, when executed by the processing system, direct the recommender system to:
generate one or more merchant tags describing merchant data corresponding to a merchant;
generate a set of audience embeddings relating to a set of audiences;
generate a set of merchant embeddings from the merchant data relating to the merchant using the one or more merchant tags;
produce a heterogenous information network of combined audience data and merchant data using the set of audience embeddings and the set of merchant embeddings;
train a neural network for performing a skip gram using a set of trained node embeddings;
analyze the heterogenous information network to identify relationships between each audience of the set of audiences and the merchant, including by applying, using the neural network, a skip gram model trained over glove embeddings of the merchant embeddings and the audience embeddings to produce a refined heterogenous information network and an updated set of trained node embeddings;
refine, by the audience recommender system, the neural network for performing the skip gram using the updated set of trained node embeddings;
determine a score for one or more audiences of the set of audiences based on the relationships between the one or more audiences and the merchant as indicated in the refined heterogenous information network; and
provide a recommendation of the one or more audiences of the set of audiences and a corresponding score for each audience.

13. The recommender system of claim 12, wherein the instructions to generate the one or more merchant tags direct the system to use customer transaction data.

14. The recommender system of claim 12, wherein the heterogenous information network comprises one or more star graphs.

15. The recommender system of claim 12, wherein the instructions to generate the set of audience embeddings direct the system to generate audience glove embeddings using a set of audience data relating to the set of audiences using an audience taxonomy.

16. The recommender system of claim 12, wherein the instructions to generate the set of merchant embeddings direct the system to generate merchant glove embeddings using the one or more merchant tags.

17. The recommender system of claim 12, further comprising instructions that direct the system to:
receive a merchant identifier of the merchant via a network interface.

18. The recommender system of claim 12, further comprising instructions that direct the system to:
receive a selection of at least one of the one or more merchant tags, the selection used for generating the set of merchant embeddings.

* * * * *